(12) United States Patent
Mishra et al.

(10) Patent No.: US 9,485,171 B2
(45) Date of Patent: Nov. 1, 2016

(54) OPTIMIZING FAULT SYNCHRONIZATION IN A BIDIRECTIONAL DATA NETWORK (71) Applicant: Ciena Corporation, Hanover, MD (US)

(72) Inventors: Ashesh Mishra, San Jose, CA (US); Mahesh Jethanandani, Saratoga, CA (US); Ankur Saxena, San Jose, CA (US); Sowmya Chandran, Fremont, CA (US)

(73) Assignee: Ciena Corporation, Hanover, MD (US)

( * ) Notice: Subject to any disclaimer, the term of this patent is extended or adjusted under 35 U.S.C. 154(b) by 282 days.

(21) Appl. No.: 13/874,250

(22) Filed: Apr. 30, 2013

(65) Prior Publication Data

US 2014/0321260 A1 Oct. 30, 2014

(51) Int. Cl.
*H04L 12/703* (2013.01)
*H04L 12/723* (2013.01)

(52) U.S. Cl.
CPC .............. *H04L 45/28* (2013.01); *H04L 45/50* (2013.01)

(58) Field of Classification Search
None
See application file for complete search history.

(56) References Cited

U.S. PATENT DOCUMENTS

| | | | |
|---|---|---|---|
| 2001/0002909 A1* | 6/2001 | Iwamoto | 370/395 |
| 2006/0034268 A1* | 2/2006 | Kim et al. | 370/389 |
| 2007/0133564 A1* | 6/2007 | Chun et al. | 370/395.51 |
| 2009/0285090 A1* | 11/2009 | Allasia et al. | 370/221 |
| 2010/0128611 A1* | 5/2010 | Deguchi | 370/242 |
| 2011/0280121 A1* | 11/2011 | Boutros | H04L 41/0677 370/221 |
| 2012/0163189 A1* | 6/2012 | Allan et al. | 370/241.1 |
| 2014/0204726 A1* | 7/2014 | Nagasawa | 370/216 |

OTHER PUBLICATIONS

Busi & Allan, "Operations, Administration, and Maintenance Framework for MPLS-Based Transport Networks," Internet Engineering Task Force (IETF), Request for Comments: 6371, Category: Informational, ISSN: 2070-1721, Sep. 2011, http://tools.ietf.org/pdf/rfc6371.pdf, pp. 1-62.

Swallow et al., "MPLS Fault Management Operations, Administration, and Maintenance (OAM)," Internet Engineering Task Force (IETF), Request for Comments: 6427, Category: Standards Track, ISSN: 2070-1721, Nov. 2011, http://tools.ietf.org/pdf/rfc6427.pdf, pp. 1-17.

\* cited by examiner

*Primary Examiner* — Mohammad Adhami
(74) *Attorney, Agent, or Firm* — Clements Bernard PLLC; Christopher L. Bernard; Lawrence A. Baratta, Jr.

(57) ABSTRACT

Methods and apparatus for optimizing fault synchronization in a bidirectional data network are provided. In an example, a downstream endpoint of the data network receives a first Alarm Indication Signal (AIS). The first AIS indicates a first FLI of an upstream interface having an interface fault. The downstream endpoint transmits, to an upstream endpoint of the data network, a second AIS including a Remote Defect Indication (RDI) and a second FLI identifying the downstream endpoint. An upstream endpoint of the data network receives the second AIS and determines that the AIS is an AIS-RDI (AIS-RDI) from the presence of the second FLI. The presence of the AIS-RDI triggers the upstream endpoint to initiate tunnel failure synchronization with the downstream endpoint.

20 Claims, 7 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  | Resvd |   Msg Type    |     Flags     | Refresh Timer |
+-+-+-+-+-+-+-+-+-+-+-+-+-+-+-+-+-+-+-+-+-+-+-+-+-+-+-+-+-+-+-+-+
| Total TLV Len |    Type=1     |    Length=8   |               |
+-+-+-+-+-+-+-+-+-+-+-+-+-+-+-+-+-+-+-+-+-+-+-+-+-+-+-+-+-+-+-+-+
|     MPLS-TP Node Identifier=NodeId of LSR                     |
+-+-+-+-+-+-+-+-+-+-+-+-+-+-+-+-+-+-+-+-+-+-+-+-+-+-+-+-+-+-+-+-+
|     MPLS-TP Interface Number=IntfNum of LSR   |    Type=2     |
+-+-+-+-+-+-+-+-+-+-+-+-+-+-+-+-+-+-+-+-+-+-+-+-+-+-+-+-+-+-+-+-+
|    Length=4   |   MPLS-TP Global Identifier=AS Number of LSR  |
+-+-+-+-+-+-+-+-+-+-+-+-+-+-+-+-+-+-+-+-+-+-+-+-+-+-+-+-+-+-+-+-+
|               |
+-+-+-+-+-+-+-+-+
```

LSR AIS Message as generated by the node closest to the fault.

FIG. 4

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  | Resvd |   Msg Type    |     Flags     | Refresh Timer |
+-+-+-+-+-+-+-+-+-+-+-+-+-+-+-+-+-+-+-+-+-+-+-+-+-+-+-+-+-+-+-+-+
| Total TLV Len |    Type=1     |    Length=8   |               |
+-+-+-+-+-+-+-+-+-+-+-+-+-+-+-+-+-+-+-+-+-+-+-+-+-+-+-+-+-+-+-+-+
|      MPLS-TP Node Identifier=NodeId of LER    |               |
+-+-+-+-+-+-+-+-+-+-+-+-+-+-+-+-+-+-+-+-+-+-+-+-+-+-+-+-+-+-+-+-+
|      MPLS-TP Interface Number=IntfNum of LER  |    Type=2     |
+-+-+-+-+-+-+-+-+-+-+-+-+-+-+-+-+-+-+-+-+-+-+-+-+-+-+-+-+-+-+-+-+
|   Length=4    |  MPLS-TP Global Identifier=AS Number of LER   |
+-+-+-+-+-+-+-+-+-+-+-+-+-+-+-+-+-+-+-+-+-+-+-+-+-+-+-+-+-+-+-+-+
|               |
+-+-+-+-+-+-+-+-+
```

LER AIS-RDI Message as generated by the downstream
endpoint towards the upstream endpoint.

*FIG. 5*

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  | Resvd |   Msg Type    |     Flags     | Refresh Timer |
+-+-+-+-+-+-+-+-+-+-+-+-+-+-+-+-+-+-+-+-+-+-+-+-+-+-+-+-+-+-+-+-+
| Total TLV Len |    Type=1     |   Length=8    |               |
+-+-+-+-+-+-+-+-+-+-+-+-+-+-+-+-+-+-+-+-+-+-+-+-+-+-+-+-+-+-+-+-+
|      MPLS-TP Node Identifier=NodeId of LER    |               |
+-+-+-+-+-+-+-+-+-+-+-+-+-+-+-+-+-+-+-+-+-+-+-+-+-+-+-+-+-+-+-+-+
|      MPLS-TP Interface Number=IntfNum of LER  |    Type=1     |
+-+-+-+-+-+-+-+-+-+-+-+-+-+-+-+-+-+-+-+-+-+-+-+-+-+-+-+-+-+-+-+-+
|   Length=8    |   MPLS-TP Node Identifier=nodeId of LSR       |
+-+-+-+-+-+-+-+-+-+-+-+-+-+-+-+-+-+-+-+-+-+-+-+-+-+-+-+-+-+-+-+-+
|               |    MPLS-TP Interface Number=intfNum of LSR    |
+-+-+-+-+-+-+-+-+-+-+-+-+-+-+-+-+-+-+-+-+-+-+-+-+-+-+-+-+-+-+-+-+
|               |    Type = 2   |   Length=4    | MPLS-TP Global|
+-+-+-+-+-+-+-+-+-+-+-+-+-+-+-+-+-+-+-+-+-+-+-+-+-+-+-+-+-+-+-+-+
|    Identifier=AS Number of LER                |    Type=2     |
+-+-+-+-+-+-+-+-+-+-+-+-+-+-+-+-+-+-+-+-+-+-+-+-+-+-+-+-+-+-+-+-+
|   Length=4    |   MPLS-TP Global Identifier=AS Number of LSR  |
+-+-+-+-+-+-+-+-+-+-+-+-+-+-+-+-+-+-+-+-+-+-+-+-+-+-+-+-+-+-+-+-+
|               |
+-+-+-+-+-+-+-+-+
```

Alternate LER AIS-RDI Message.

OPTIMIZING FAULT SYNCHRONIZATION IN A BIDIRECTIONAL DATA NETWORK

FIELD OF DISCLOSURE

This disclosure relates generally to electronics, and more specifically, but not exclusively, to methods and apparatus that optimize fault synchronization in a bidirectional data network.

BACKGROUND

Failure notification is an important part of Operation, Administration and Maintenance (OAM) in conventional data networks to enable quick failure detection and an ability to take action to correct the failure. When a fault condition occurs, an intermediate node logically adjacent to the fault generates and sends an Alarm Indication Signal (AIS) downstream to a downstream endpoint. Conventionally, only transit nodes (i.e., nodes other than endpoint nodes) generate AIS messages to identify faults in the server sub-layer. The AIS informs the downstream endpoint of the failure and triggers a reaction to the fault. Conventional implementations of AIS are detailed in Internet Engineering Task Force Request for Comments #6371 and #6427, which is incorporated by reference herein in its entirety. However, conventional techniques fail to address propagating the fault information upstream to the other end of the network to coordinate failure protection by both ends.

The conventional preferred method of live connectivity monitoring uses a Bidirectional Forwarding Detection (BFD) mechanism to inform the upstream endpoint of the failure. When an AIS message is received by the downstream endpoint, the downstream endpoint determines which upstream tunnel is associated with the failed downstream tunnel. The downstream endpoint then checks to see if BFD is configured on the upstream tunnel. If BFD is configured on the upstream tunnel, the downstream endpoint informs BFD that the downstream endpoint needs to send a Remote Defect Indication (RDI) to the upstream endpoint. Upon receiving a BFD message with RDI, the upstream endpoint will perform failure protection.

There is no operational requirement that an operator has to run BFD in their network. In addition, less sophisticated and inexpensive systems do not have sufficient capability to run BFD. Currently, BFD is the only method available to send failure notification upstream in an associated data network tunnel. BFD is a resource-intensive protocol that uses resources that are generally not available on less sophisticated and inexpensive networks, and is not scalable on sophisticated and expensive networks. Further, running BFD for the sole purpose of failure notification is a significant waste of resources. However, if the data network is not configured to implement BFD or other fault synchronization technology, then, currently, there is no way to synchronize the fault.

Conventional techniques and devices suffer from problems including high cost, lack of scalability, severely limited alternative solutions, high resource usage, and high energy consumption.

Accordingly, there are long-felt industry needs for methods and apparatus that improve upon conventional methods and apparatus, including methods and apparatus that optimize fault synchronization in a bidirectional data network.

SUMMARY

This summary provides a basic understanding of some aspects of the present teachings. This summary is not exhaustive in detail, and is neither intended to identify all critical features, nor intended to limit the scope of the claims.

Exemplary methods and apparatus for optimizing fault synchronization in a bidirectional data network are provided. The method includes receiving, at a downstream endpoint, at least one of a first Alarm Indication Signal (AIS) indicating a first Fault Location Information (FLI) of an upstream interface having an interface fault and a Link Down Indicator (LDI), as well as transmitting, to an upstream endpoint, a second AIS including a second FLI and a Remote Defect Indication (RDI). The FLI is the Interface Identifier Type-Length Value (TLV) and the Global Identifier TLV described in the aforementioned AIS IETF standards. The second AIS includes the second FLI and may include the first FLI as received by the downstream endpoint. In examples, the first FLI identifies the source of the first AIS received on an upstream interface having an interface fault. The second FLI identifies the downstream endpoint. In a further example, provided is a non-transitory computer-readable medium, comprising instructions stored thereon that, if executed by a processor, cause the processor to execute at least a part of the aforementioned method. The non-transitory computer-readable medium can be integrated with at least one of a network interface, a physical layer device, a router, a switch, a transceiver, a repeater, an add-drop multiplexer, a transponder, and an electrical device configured to process data.

In another example, provided is an apparatus configured to optimize fault synchronization in a bidirectional data network. The apparatus includes means for receiving, at a downstream endpoint, at least one of a first Alarm Indication Signal (AIS) indicating a first FLI of an upstream interface having an interface fault and a link down indicator indicating the first FLI of the upstream interface having the interface fault. The apparatus also includes means for transmitting, to an upstream endpoint, a second AIS including a second FLI and a Remote Defect Indication (RDI). The FLI is the Interface Identifier TLV and the Global Identifier TLV described in the aforementioned AIS IETF standards. The second AIS includes the second FLI and may include the first FLI as received by the downstream endpoint. In examples, the first FLI identifies the source of the first AIS received on an upstream interface having an interface fault. The second FLI identifies the downstream endpoint. In a further example, provided is a non-transitory computer-readable medium, comprising instructions stored thereon that, if executed by a processor, cause the processor to execute at least a part of the aforementioned method. The non-transitory computer-readable medium can be integrated with at least one of a network interface, a physical layer device, a router, a switch, a transceiver, a repeater, an add-drop multiplexer, a transponder, and an electrical device configured to process data.

In another example, provided is an apparatus configured to optimize fault synchronization in a bidirectional data network. The apparatus includes a processor configured to receive, at a downstream endpoint, at least one of a first Alarm Indication Signal (AIS) indicating a first FLI of an upstream interface having an interface fault and a link down indicator indicating the first FLI of the upstream interface having the interface fault. The processor is also configured to transmit, to an upstream endpoint, a second AIS including a second FLI and a Remote Defect Indication (RDI). The FLI is the Interface Identifier TLV and the Global Identifier TLV described in the aforementioned AIS IETF standards. The second AIS includes the second FLI and may include the first FLI as received by the downstream endpoint. In examples, the first FLI identifies the source of the first AIS received on an upstream interface having an interface fault. The second FLI identifies the downstream endpoint. At least a part of the apparatus can be integrated in a semiconductor die. Further, at least a part of the apparatus can be integrated with at least one of a network interface, a physical layer device, a router, a switch, a transceiver, a repeater, an add-drop multiplexer, a transponder, and an electrical device configured to process data. In a further example, provided is a non-transitory computer-readable medium, comprising instructions stored thereon that, if executed by a lithographic device, cause the lithographic device to fabricate at least a part of the apparatus.

Furthermore, additional exemplary methods and apparatus for optimizing fault synchronization in a bidirectional data network are provided. For example, a method includes receiving, at an upstream endpoint, an Alarm Indication Signal (AIS) including an FLI and a Remote Defect Indication (RDI). The RDI may include another FLI of a downstream interface having an interface fault. The method also includes determining that the AIS is an AIS-RDI from the FLI identifying the downstream endpoint, as well as initiating tunnel failure synchronization with the downstream endpoint, based on the presence of the AIS-RDI. In a further example, provided is a non-transitory computer-readable medium, comprising instructions stored thereon that, if executed by a processor, cause the processor to execute at least a part of the aforementioned method. The non-transitory computer-readable medium can be integrated with at least one of a network interface, a physical layer device, a router, a switch, a transceiver, a repeater, an add-drop multiplexer, a transponder, and an electrical device configured to process data.

In another example, provided is an apparatus configured to optimize fault synchronization in a bidirectional data network. The apparatus includes means for receiving, at an upstream endpoint, an Alarm Indication Signal (AIS) including an FLI and a Remote Defect Indication (RDI). The RDI may include another FLI of a downstream interface having an interface fault. The method also includes determining that the AIS is an AIS-RDI from the FLI identifying the downstream endpoint, as well as initiating tunnel failure synchronization with the downstream endpoint, based on the presence of the AIS-RDI. At least a part of the apparatus can be integrated in a semiconductor die. Further, at least a part of the apparatus can be integrated with at least one of a network interface, a physical layer device, a router, a switch, a transceiver, a repeater, an add-drop multiplexer, a transponder, and an electrical device configured to process data. In a further example, provided is a non-transitory computer-readable medium, comprising instructions stored thereon that, if executed by a lithographic device, cause the lithographic device to fabricate at least a part of the apparatus.

The foregoing broadly outlines some of the features and technical advantages of the present teachings in order that the detailed description and drawings can be better understood. Additional features and advantages are also described in the detailed description. The conception and disclosed embodiments can be readily utilized as a basis for modifying or designing other structures for carrying out the same purposes of the present teachings. Such equivalent constructions do not depart from the technology of the teachings as set forth in the claims. The novel features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to describe examples of the present teachings, and are not limiting.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Introduction

Examples of the current teachings are disclosed in this application's text and related drawings. The examples advantageously address the long-felt industry needs, as well as other previously unidentified needs, and mitigate shortcomings of the conventional methods and apparatus. Alternate embodiments may be devised without departing from the scope of the invention. Additionally, conventional elements of the current teachings may not be described in detail, or may be omitted, to avoid obscuring aspects of the current teachings.

In an example, a downstream node in a bidirectional data network uses an Alarm Indication Signal (AIS) message to send a Remote Defect Indication (RDI) notification (also known as an AIS-RDI) to an upstream endpoint.

In another example, methods and apparatus that optimize fault synchronization in a bidirectional data network are provided. In an example, a downstream endpoint of the data network receives a first Alarm Indication Signal (AIS). The first AIS includes a first Fault Location Information (FLI) of an upstream interface having an interface fault (e.g., in the server sub-layer). The downstream endpoint transmits, to an upstream endpoint of the data network, a second AIS including a second FLI and a Remote Defect Indication (RDI). The FLI is the Interface Identifier Type-Length Value (TLV) and the Global Identifier TLV described in the AIS IETF standards. The second AIS may include the first FLI as received by the downstream endpoint. In examples, the first FLI identifies the source of the first AIS received on an upstream interface having an interface fault. The second FLI identifies the downstream endpoint. An upstream endpoint of the data network receives the second AIS and determines that the RDI is an AIS-RDI (AIS-RDI) from the presence of the second FLI in the RDI. The presence of the AIS-RDI triggers the upstream endpoint to initiate tunnel failure synchronization with the downstream endpoint.

The exemplary methods and apparatuses disclosed herein provide several advantages and improvements over conventional techniques. For example, the provided methods and apparatuses not only provide failure notifications and achieve fault synchronization, but by using an event-based mechanism, are also scalable across both complex network equipment and simple network equipment. A further advantage is that the provided methods and apparatuses do not require (and in some cases can eliminate) a live connectivity monitoring mechanism.

Further, instead of running a Bidirectional Forward Detection (BFD) mechanism at a regular interval, the provided methods and apparatuses use an event-based notification that is triggered only when a failure notification is received. Thus, the provided methods and apparatuses solve the problem of failure notification and fault synchronization by providing a mechanism that does not involve using BFD. The requirements for sending and processing AIS-based messages are not as stringent as those for BFD, and require fewer resources to scale, while achieving the same failure notification and failure synchronization requirements. The provided methods and apparatuses also implement end-to-end failure synchronization faster than any other software-based live connectivity monitoring mechanism.

Moreover, the AIS-RDI message format and transmission mode are compatible with the industry-standard AIS message format and transmission mode used by intermediate nodes. Additionally, since AIS-RDI carries information pertaining to the fault, an operator can identify the exact location of the fault by correlating the AIS and the AIS-RDI notifications from the two end points of the bidirectional data path.

With the provided methods and apparatuses, fault synchronization is simpler than conventional techniques, and the provided methods and apparatuses can affect protection switchover without depending on any other operations, administration, and maintenance (OAM) protocol. This provides end users with more flexibility while configuring OAM protocols.

As used herein, the term "exemplary" means "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region and/or the optical (both visible and invisible) region. These are several non-limiting and non-exhaustive examples.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a command, information, a signal, a bit, and/or a symbol described in this description can be represented by a voltage, a current, an electromagnetic wave, a magnetic field and/or particle, an optical field and/or particle, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

The terminology used herein is for the purpose of describing particular embodiments only and is not intended to be limiting. As used herein, the singular forms "a," "an," and "the" are intended to include the plural forms as well, unless the context clearly indicates otherwise. Further, the terms "comprises," "comprising," "includes," and "including," when used herein, specify a presence of stated features, integers, steps, operations, elements, and/or components, but do not preclude the presence and/or addition of one or more other features, integers, steps, operations, elements, components, and/or groups thereof.

DESCRIPTION OF THE FIGURES

Figure 1A:
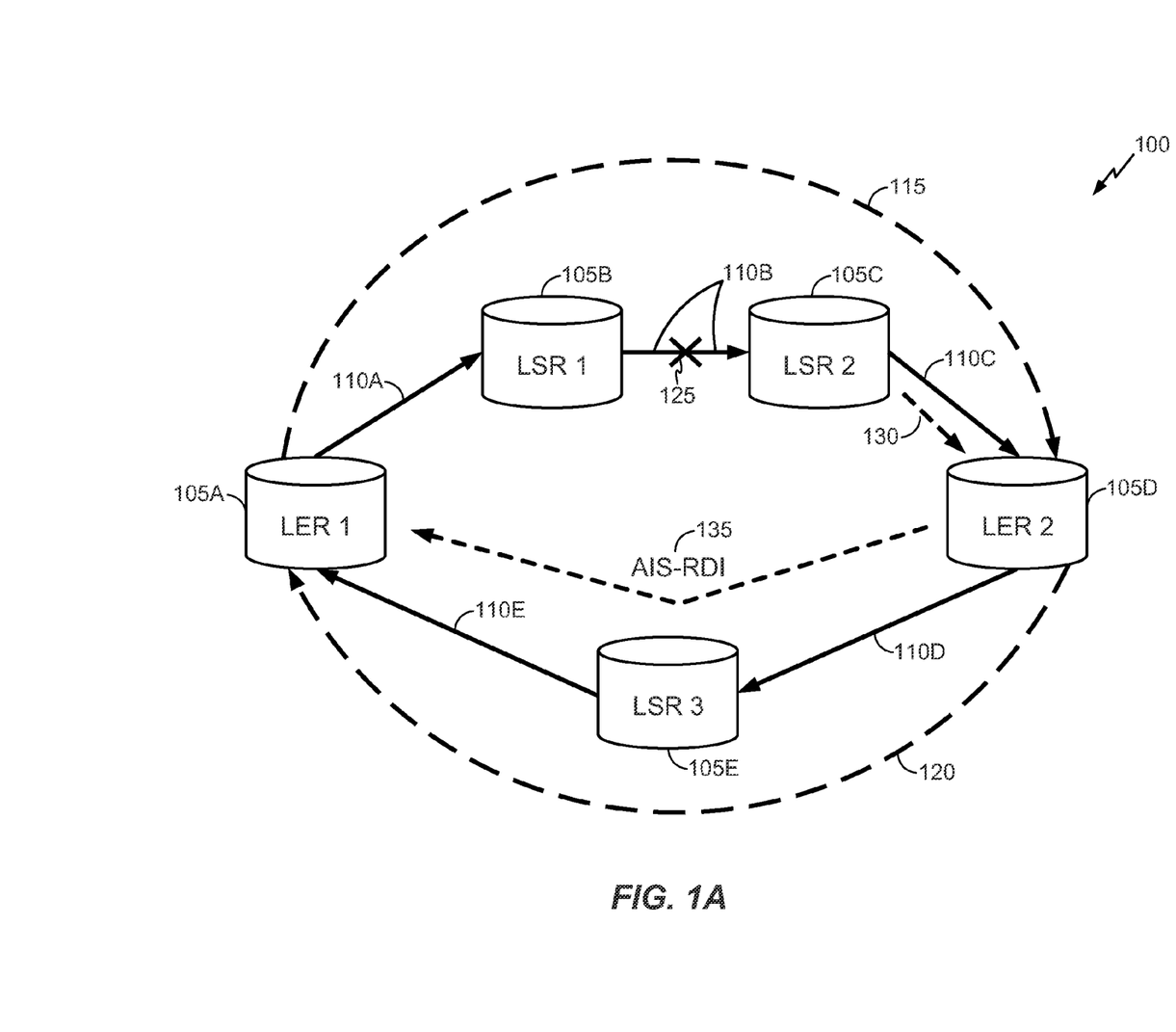
FIG. 1A depicts an exemplary block diagram of a portion of an exemplary network.

FIG. 1A depicts an exemplary block diagram of an exemplary network 100. FIG. 1A also depicts an example of how the provided fault notification mechanism works with Associated Bidirectional Multi Protocol Label Switching (MPLS) Transport-Profile (TP) Label Switched Paths (LSPs). In an example, the network 100 is a statically-provisioned bidirectional data network.

The network 100 includes a plurality of coupled network elements, including label edge router one (LER1)(105A), label switch router one (LSR1)(105B), label switch router two (LSR2)(105C), label edge router two (LER2)(105D), and label switch router three (LSR3)(105E). The network 100 can be any type of digital communications network using Multiprotocol Label Switching (MPLS) and at least one of a variety of communications architectures and interfaces (e.g., Ethernet, Gigabit-Ethernet, ATM, packet data, MPLS, SONET, TDM, WDM, SDH, etc). The LER1 105A, the LSR1 105B, the LSR2 105C, the LER2 105D, and the LSR3 105E can be any type of known network devices such as a network interface, a physical layer device, a router, a switch, a transceiver, a repeater, an add-drop multiplexer, a transponder, and an electrical device configured to process data.

The network elements (e.g., the LSRs and the LERs) in the network 100 are coupled to each other by a plurality of links 110A-E. The links 110A-E can be any transmission medium capable of carrying a signal, such as optical fiber, coaxial cable, twisted pair cable, wireless radio, etc. The network elements and the links 110A-E provide data paths through the network 100. In FIG. 1A, the network elements and links provide data paths (e.g., unidirectional paths and/or bidirectional paths) between the LER1 105A and the LER2 105D. For example, a first label switched path (LSP) 115 is a unidirectional path from the LER1 105A via the link 110A, the LSR1 105B, the link 110B, the LSR2 105C, and the link 110C to the LER2 105D. In the first LSP 115, the LER1 105A is the upstream node and the LER2 105D is the downstream node. A second LSP 120 is a unidirectional path from the LER2 105D via the link 110D, the LSR3 105E, and the link 110E to the LER1 105A. The first LSP 115 and the second LSP 120 can be associated (i.e., logically grouped) to form a bidirectional data link.

Figure 1B:
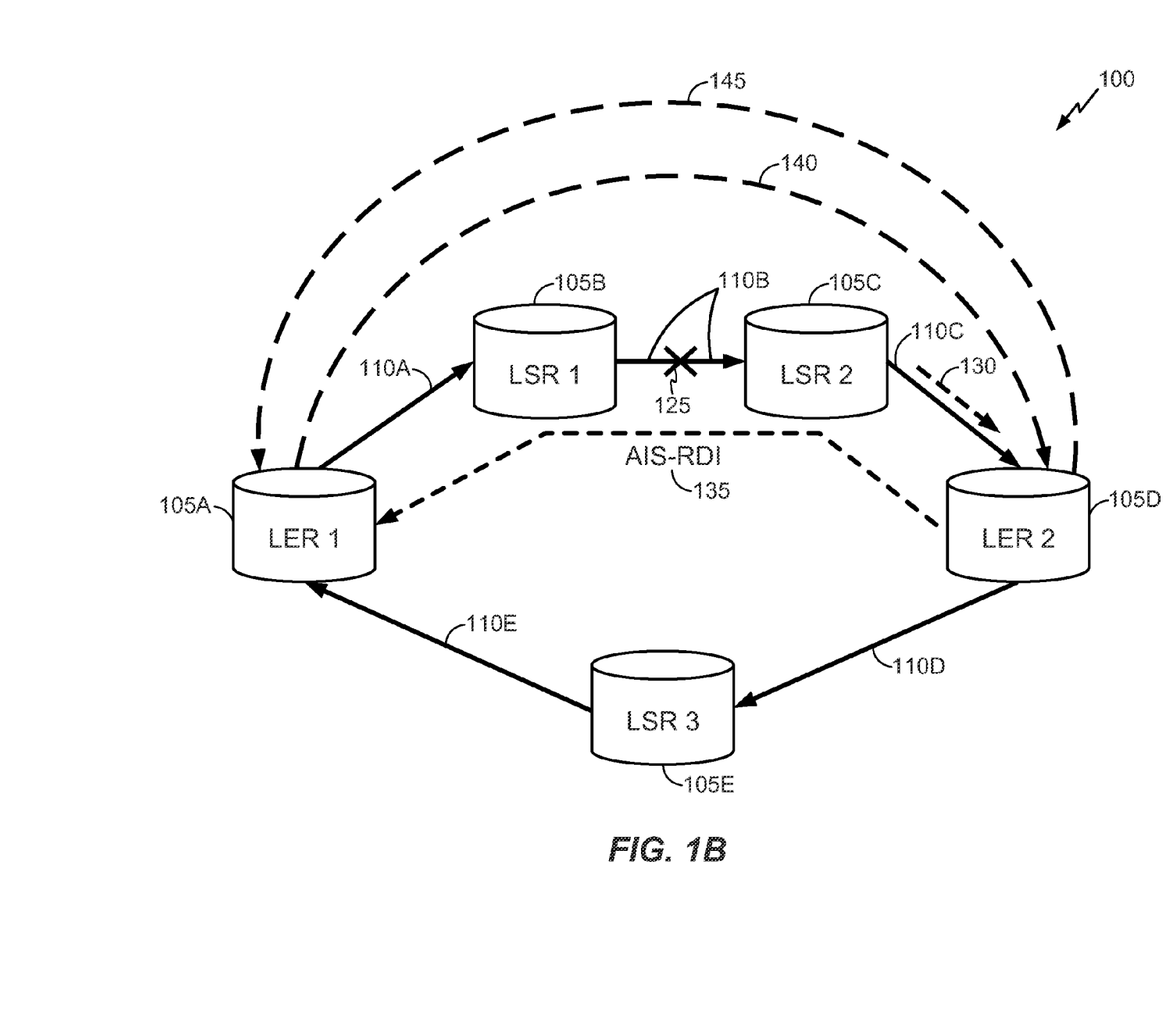
FIG. 1B depicts another exemplary block diagram of a portion of an exemplary network.

FIG. 1B depicts an exemplary block diagram of the exemplary network 100, in which signal paths are co-routed. In FIG. 1B, the network elements (e.g., the LSRs and the LERs) and the links 110A-E provide data paths (e.g., unidirectional paths and/or bidirectional paths) between the LER1 105A and the LER2 105D. For example, a third LSP 140 is a part of a co-routed signal path from the LER1 105A via the link 110A, the LSR1 105B, the link 110B, the LSR2 105C, and the link 110C to the LER2 105D. In the third LSP 140, the LER1 105A is the upstream node and the LER2 105D is the downstream node. A fourth LSP 145 is another part of the co-routed signal path from the LER2 105D via the link 110C, the LSR2 105C, the LSR1 105B, and the link 110A to the LER1 105A. The third LSP 140 and the fourth LSP 145 can be associated (i.e., logically grouped) to form a bidirectional data link.

While examples described herein are directed primarily at packet data networks, the methods and apparatuses described herein can also be used in other types of networks. By way of example, but not limitation, the methods described herein can be readily adapted to a Synchronous Optical Network (SONET) or Synchronous Digital Hierarchy (SDH) network.

Since end users desire un-interrupted flow of data, switchover to a backup path routing data around the fault is required. In order to trigger switchover to the protection path, the upstream endpoint needs to be notified of the fault. The proposed methods and apparatus use AIS messages as a fault notification mechanism.

Figure 4:
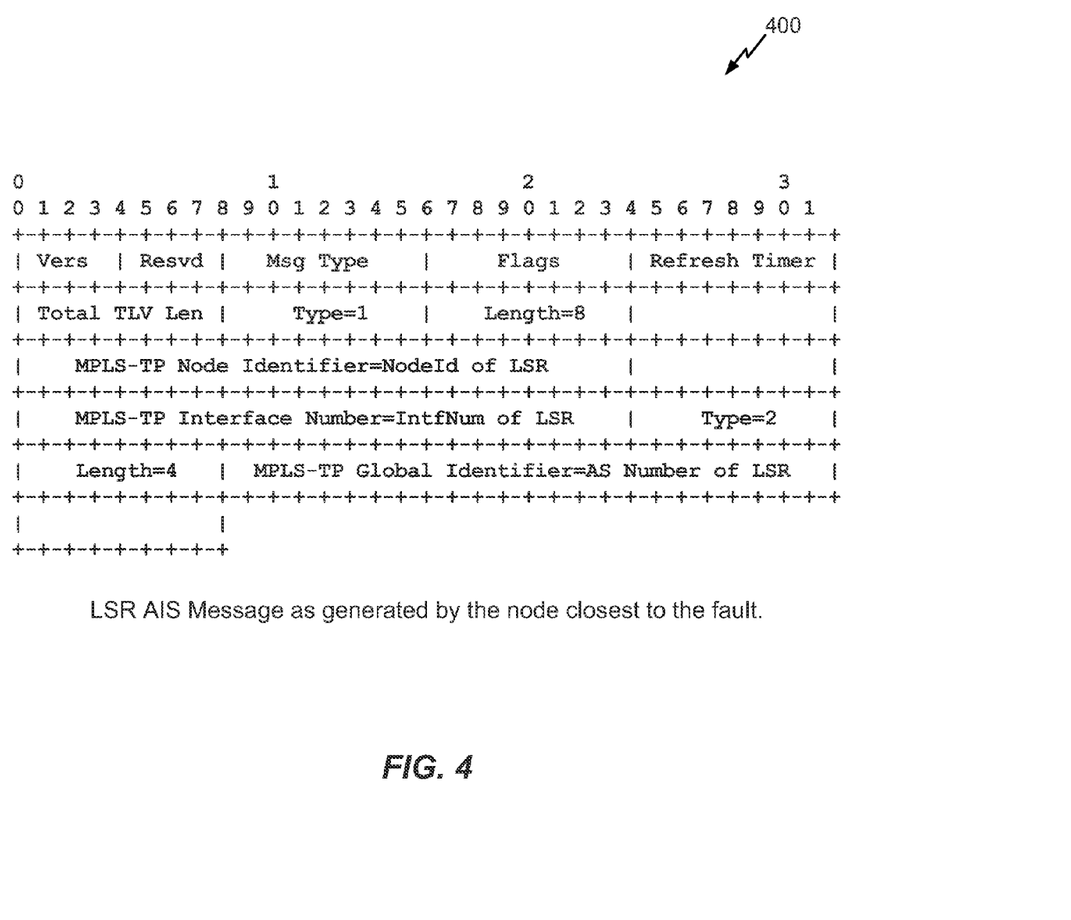
FIG. 4 depicts an exemplary Label Switch Router Alarm Indication Signal Message as generated by a node closest to a fault.

FIG. 1A depicts a fault 125, such as a signal failure. When a downstream node detects that an upstream interface has faulted, the downstream node generates and transmits a first AIS message including information about the faulted interface (e.g., first Fault Location Information (FLI)) and/or Link Down Indication (LDI) message including information about the faulted interface (e.g., the first Fault Location Information (FLI)). The first FLI is the Interface Identifier TLV and the Global Identifier TLV described in the aforementioned AIS IETF standards. The first FLI identifies the source of the first AIS received on an upstream interface having an interface fault. Referring to FIG. 1A, when the downstream node LSR2 105C detects the fault 125, the downstream node LSR2 105C generates a first AIS message 130 including the first FLI and/or an LDI message 1, and sends the first AIS message 130 downstream to the LER2 105D. A detailed example of the first AIS message 130 is depicted in FIG. 4.

Upon receiving an AIS failure indication and/or a Link Down Indication (LDI) message from an intermediate node, the downstream endpoint forms and transmits a second AIS message carrying a second FLI and a Remote Defect Indication (RDI) notification (herein an AIS-RDI message) to the upstream endpoint to notify the upstream endpoint of the fault. The second FLI identifies the downstream endpoint. The second AIS message may also include the first FLI. Referring to FIG. 1A, upon receiving the first AIS message 130 from the LSR2 105C, the LER2 105D forms an AIS-RDI message 135 (i.e., second AIS) and transmits the AIS-RDI message 135 to the LER1 105A to notify the LER1 105A of the fault.

Figure 5:
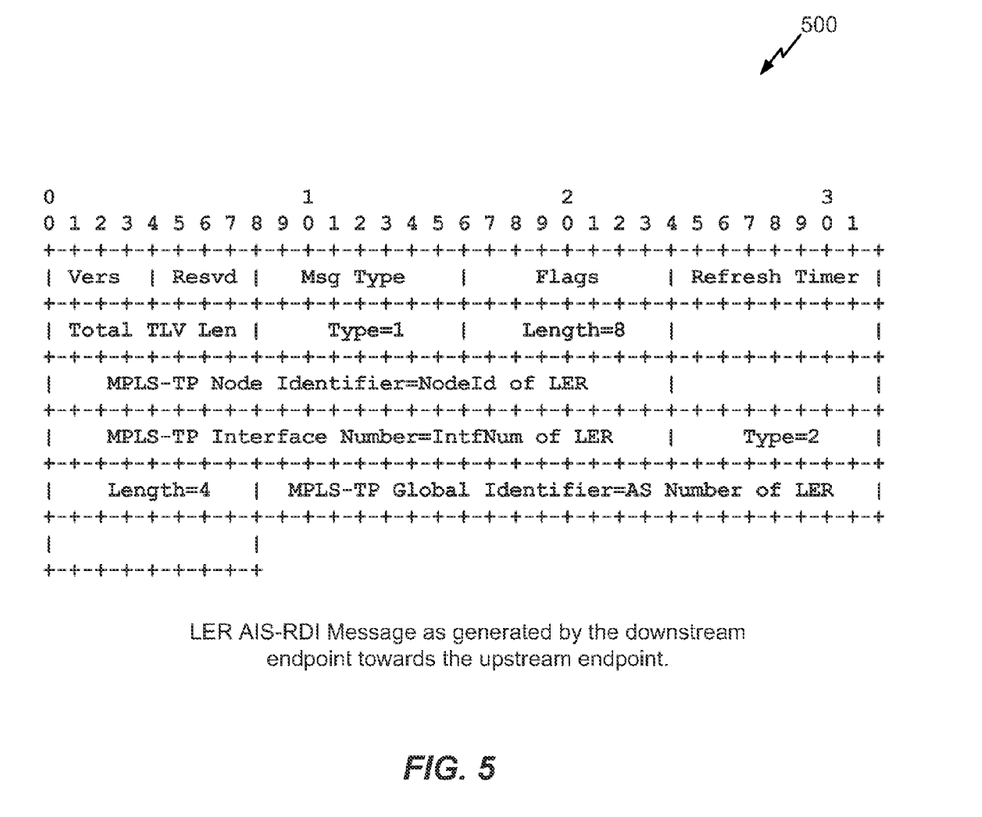
FIG. 5 depicts an exemplary Label End Router Alarm Indication Signal-Remote Defect Indication Message as generated by a downstream endpoint towards an upstream endpoint.
Figure 6:
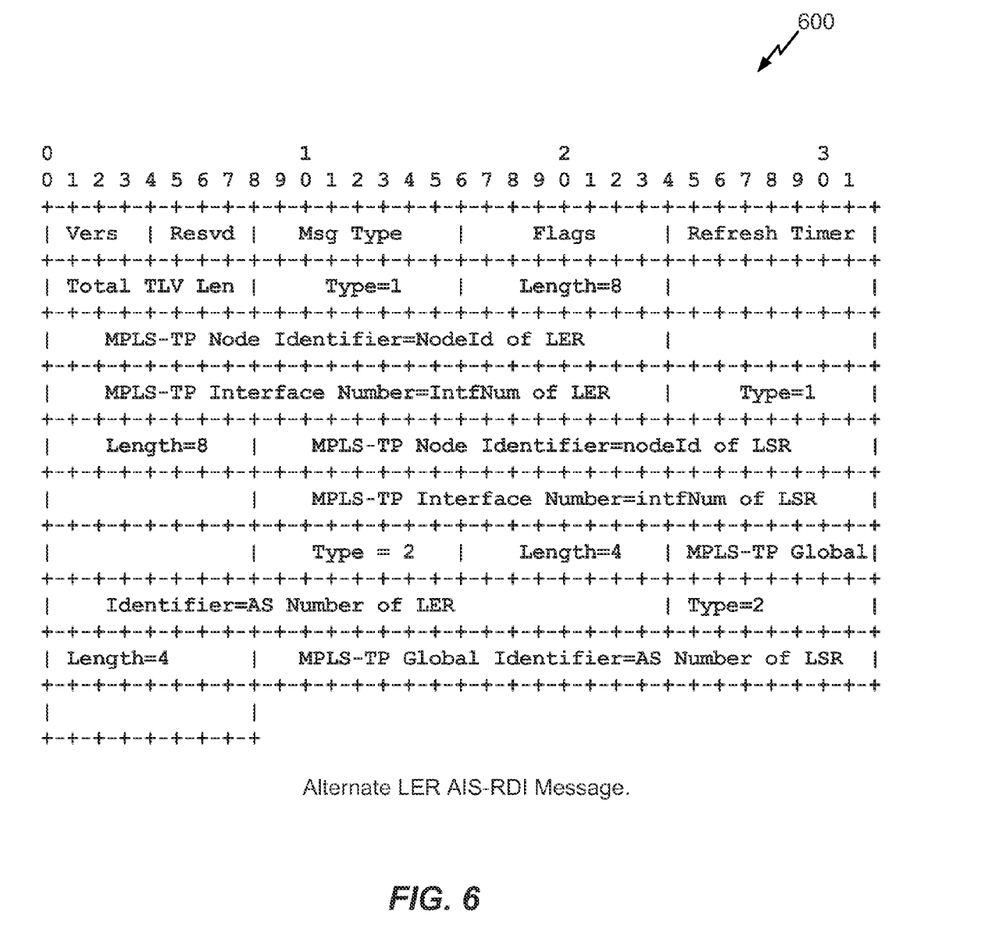
FIG. 6 depicts another exemplary Label End Router Alarm Indication Signal-Remote Defect Indication Message as generated by the downstream endpoint towards the upstream endpoint.

The AIS-RDI message 135 includes the second FLI identifying the LER2 105D, thus differentiating the AIS-RDI message 135 from other AIS messages. The AIS-RDI message 135 may also include the first FLI. The second FLI and/or the first FLI can be used to identify the location of the fault 125. The AIS-RDI message 135 can be transmitted via an unidirectional tunnel (e.g., the second LSP 120) that is associated with the tunnel on which the failure was noticed (e.g., the first LSP 115). Referring to FIG. 1A, the AIS-RDI message 135 is transmitted from the LER2 105D to the LER1 105A via the second LSP 120. Detailed examples of the AIS-RDI message 135 are depicted in FIGS. 5-6.

When the upstream endpoint receives the AIS-RDI message 135, the upstream endpoint reads the second FLI in the AIS-RDI message 135 and determines that the AIS-RDI message 135 was sent by the endpoint, instead of by an intermediate node. This indicates to the upstream endpoint that received AIS-RDI message 135 is an AIS-RDI message 135, and not only an AIS message. As part of processing of the AIS-RDI message 135, the upstream endpoint implements tunnel failure synchronization, thus coordinating with the downstream endpoint and reducing the amount of data that will be lost due to the fault and a subsequent data network failover. Referring to FIG. 1A, on receipt of the AIS-RDI message 135, the LER1 105A processes the AIS-RDI message 135, including reading the second FLI in the AIS-RDI message 135 and determining that the AIS-RDI message 135 was sent by the LER2 105D, instead of an intermediate node. This indicates to the LER1 105A that the received AIS-RDI message 135 is an AIS-RDI message, and not merely an AIS message. As part of processing of the AIS-RDI message 135, the LER1 105A implements tunnel failure synchronization, thus coordinating with the LER2 105D to reduce the amount of data that will be lost due to the fault 125 and a subsequent data network failover. The data network failover can include routing data from the LER1 105A to the LER2 105D on a path (e.g., an LSP) that does not include the fault 125.

FIG. 1B also depicts the fault 125, which can be a unidirectional fault. When signal paths are co-routed and a downstream node detects that an upstream interface has faulted, the downstream node generates and transmits a first AIS message indicating a first FLI and/or an LDI message indicating the first FLI, and sends the first AIS and/or LDI message downstream to the downstream endpoint. Referring to FIG. 1B, when the downstream node LSR 2 105C detects the fault 125, the downstream node LSR2 105C generates a first AIS message and/or LDI message 130 including information about the faulted interface (e.g., the first FLI), and sends the AIS and/or LDI message 130 downstream to the LER2 105D. A detailed example of the AIS message 130 is depicted in FIG. 4.

Upon receiving an AIS failure indication and/or a Link Down Indication (LDI) message from a intermediate node, the downstream endpoint forms and transmits an AIS-RDI message (e.g., a second AIS) including a second FLI and an RDI to the upstream endpoint to notify the upstream endpoint of the fault. Referring to FIG. 1B, upon receiving the first AIS failure indication and/or the LDI message 130 from the LSR2 105C, the LER2 105D forms the AIS-RDI message 135 and transmits the AIS-RDI message 135 to the LER1 105A to notify the LER1 105A of the fault. The AIS-RDI message 135 can be routed via the part of the co-routed signal path that does not include the fault 125 (e.g., the fourth LSP 145). Referring to FIG. 1B, the AIS-RDI message 135 is transmitted from the LER2 105D to the LER1 105A via the fourth LSP 145. In FIG. 1B, on receipt of the AIS-RDI message 135, the LER1 105A processes the AIS-RDI message 135, including reading the second FLI the AIS-RDI message 135 and determining that the AIS-RDI message 135 was sent by the LER2 105D, instead of an intermediate node. This indicates to the LER1 105A that the received AIS-RDI message 135 is an AIS-RDI message, and not merely an AIS message. As part of processing of the AIS-RDI message 135, the LER1 105A implements tunnel failure synchronization, thus coordinating with the LER2 105D to reduce the amount of data that will be lost due to the fault 125 and a subsequent data network failover. The data network failover can include routing data from the LER1 105A to the LER2 105D on a path (e.g., an LSP) that does not include the fault 125.

Figure 2:
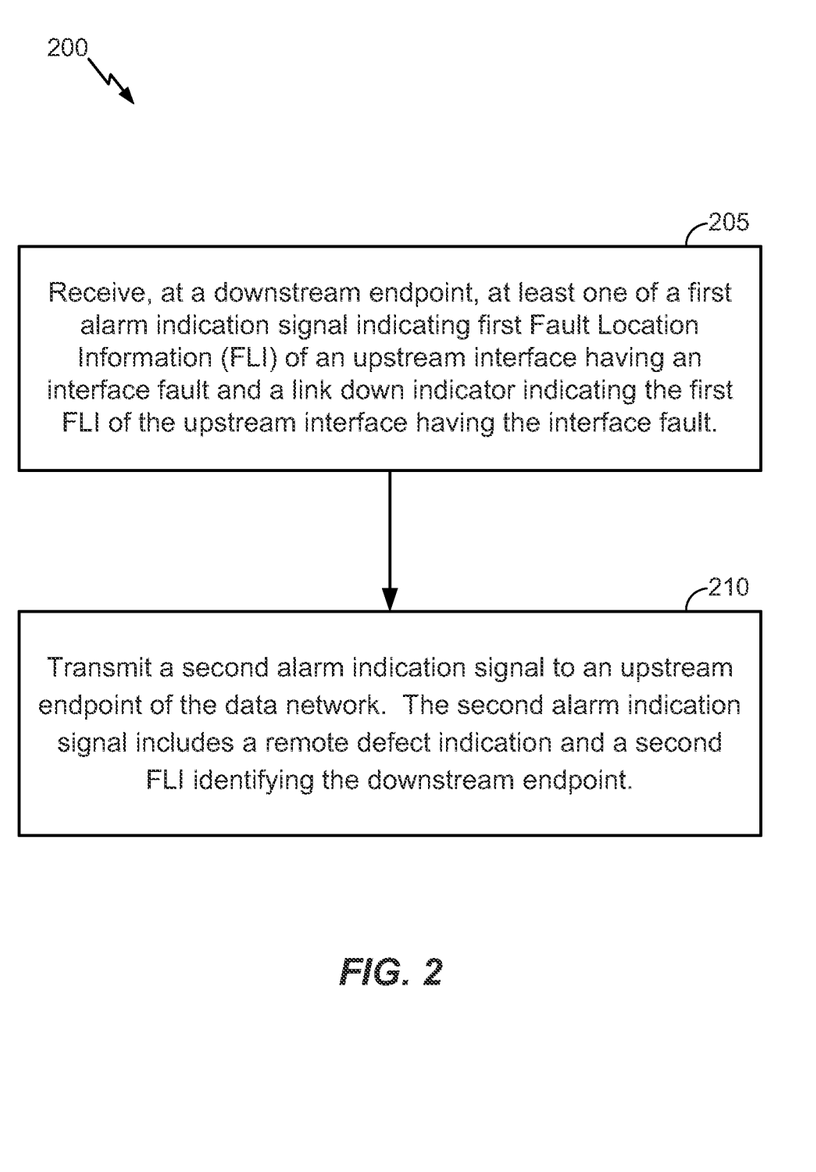
FIG. 2 depicts an exemplary method that optimizes fault synchronization in a bidirectional data network.

FIG. 2 depicts an exemplary method 200 that optimizes fault synchronization in a bidirectional data network. The method 200 can be performed by a downstream endpoint of a bidirectional data network. The method for optimizing fault synchronization in a bidirectional data network can be performed by the apparatus described hereby, such as a network interface, a physical layer device, a router, a Label End Router, a switch, a transceiver, a repeater, an add-drop multiplexer, a transponder, and an electrical device configured to process data.

In step 205, at least one of a first Alarm Indication Signal including a first FLI of an upstream interface having an interface fault and a Link Down Indicator (LDI) indicating the first FLI of the upstream interface having the interface fault is received at a downstream endpoint.

In step 210, a second Alarm Indication Signal is transmitted to an upstream endpoint of the data network. The second Alarm Indication Signal includes a Remote Defect Indication (RDI), thus making the second AIS an AIS-RDI. The second AIS includes a second FLI identifying the downstream endpoint and may include the first FLI. The first and second FLIs are carried in respective fields within an interface type-length value (TLV) element in the AIS-RDI.

Figure 3:
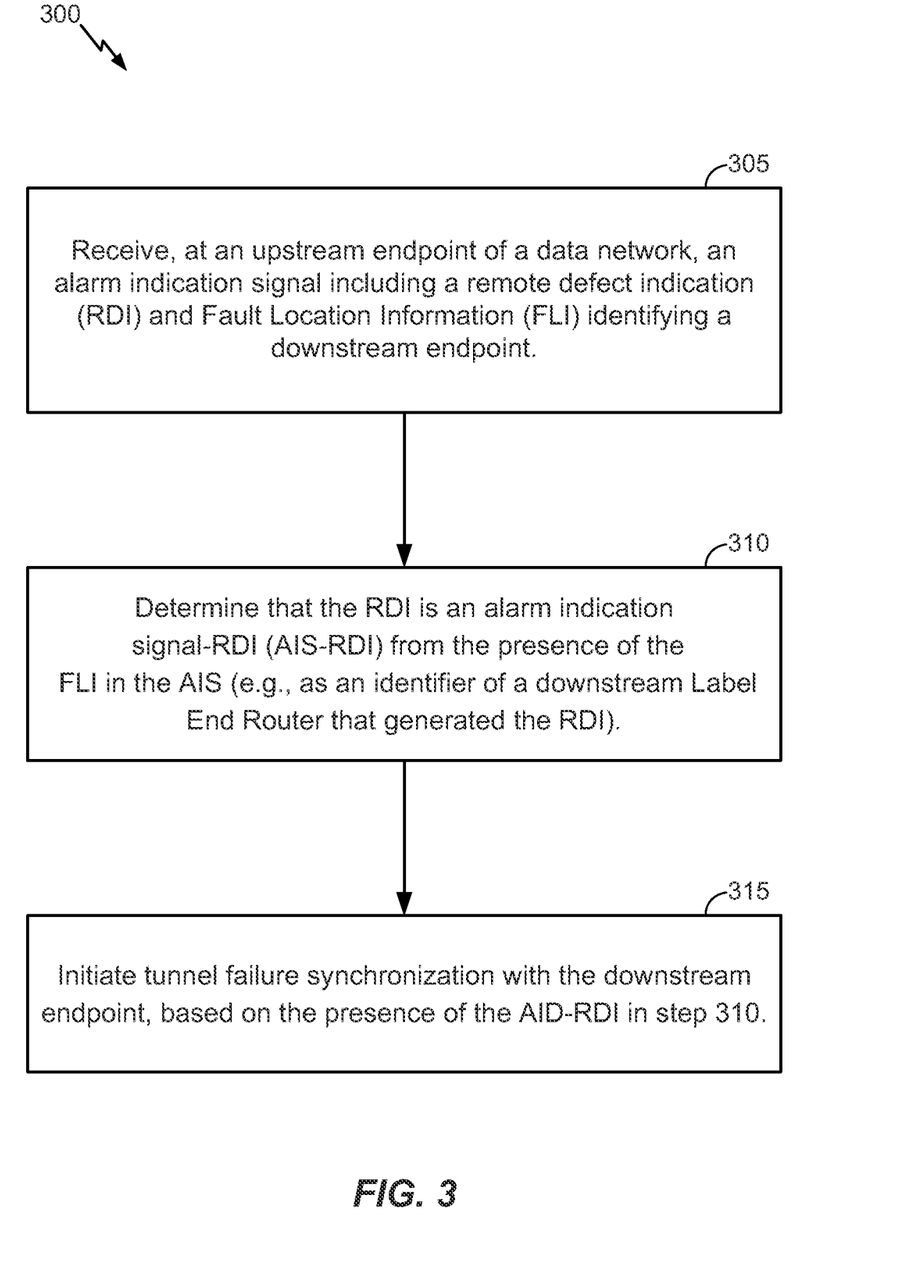
FIG. 3 depicts another exemplary method that optimizes fault synchronization in a bidirectional data network.

FIG. 3 depicts an exemplary method 300 that optimizes fault synchronization in a bidirectional data network. The method 300 can be performed by an upstream endpoint of a bidirectional data network. The method for optimizing fault synchronization in a bidirectional data network can be performed by the apparatus described hereby, such as a network interface, a physical layer device, a router, a Label End Router, a switch, a transceiver, a repeater, an add-drop multiplexer, a transponder, and an electrical device configured to process data.

In step 305, an Alarm Indication Signal including an FLI and a Remote Defect Indication (RDI) is received at an upstream endpoint of the data network.

In step 310, it is determined that the second AIS is an Alarm Indication Signal-RDI (AIS-RDI) from the presence of the FLI in the RDI (e.g., as an identifier of a downstream LER that generated the RDI).

In step 315, tunnel failure synchronization with the downstream endpoint is initiated, based on the presence of the AIS-RDI in step 310.

FIG. 4 depicts an exemplary Label Switch Router (LSR) Alarm Indication Signal (AIS) Message 400, which is generated by a node closest to a fault. The AIS Message 400 is a detailed example of the AIS message 130. The AIS Message 400 carries two identifiers. The first identifier in the message includes two sub-identifiers—an MPLS-TP Node Identifier and an MPLS-TP Interface Number. The second identifier is a MPLS-TP Global Identifier.

FIG. 5 depicts an exemplary Label End Router (LER) Alarm Indication Signal-Remote Defect Indication (AIS-RDI) Message 500 as generated by a downstream endpoint towards an upstream endpoint. The AIS-RDI Message 500 is a detailed example of the AIS-RDI message 135. The AIS-RDI Message 500 is the second AIS message, which carries two identifiers, similar to the AIS Message 400, albeit with different values. For example, the interface number can be zero to indicate that the AIS-RDI Message 500 is coming from the LER2 105D instead of the LSR2 105C, thus the Node Identifier is the identifier of the LER2 105D. The Global Identifier is the identifier of the LER2 105D.

FIG. 6 depicts another exemplary Label End Router (LER) Alarm Indication Signal-Remote Defect Indication (AIS-RDI) Message 600 as generated by the downstream endpoint towards the upstream endpoint. The AIS-RDI Message 600 is another detailed example of the AIS-RDI message 135. The AIS-RDI Message 600 combines the information received in the AIS Message 400 with the information in the AIS-RDI Message 500. In this particular case, the AIS-RDI Message 600 carries four identifiers. The first identifier includes the two sub-identifiers for the LSR2 105C, the second identifier includes the two sub-identifiers for the LER2 105E, the third identifier is the Global Identifier for the LSR2 105C, and the fourth identifier is the Global Identifier for the LER2 105E.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

At least a portion of the methods, sequences and/or algorithms described in connection with the embodiments disclosed herein may be embodied directly in hardware, in a software module executed by a processor, or in a combination of the two. In an example, a processor includes multiple discrete hardware components. A software module may reside in RAM memory, flash memory, ROM memory, EPROM memory, EEPROM memory, registers, hard disk, a removable disk, a CD-ROM, and/or any other form of storage medium known in the art. An exemplary storage medium can be coupled to the processor such that the processor can read information from, and write information to, the storage medium. In an alternative, the storage medium may be integral with the processor.

Further, many embodiments are described in terms of sequences of actions to be performed by, for example, elements of a computing device. Various actions described herein can be performed by a specific circuit (e.g., an application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, a corresponding circuit of any such embodiments may be described herein as, for example, "logic configured to" perform a described action.

An embodiment of the invention can include a computer readable media embodying a method described herein. Accordingly, the invention is not limited to illustrated examples, and any means for performing the functionality described herein are included in embodiments of the invention.

The disclosed devices and methods can be designed and configured into a computer-executable file that is in a Graphic Database System Two (GDSII) compatible format, an Open Artwork System Interchange Standard (OASIS) compatible format, and/or a GERBER (e.g., RS-274D, RS-274X, etc.) compatible format, which are stored on a non-transitory (i.e., a non-transient) computer-readable media. The file can be provided to a fabrication handler who fabricates with a lithographic device, based on the file, an integrated device. In an example, the integrated device is on a semiconductor wafer. The semiconductor wafer can be cut into a semiconductor die and packaged into a semiconductor chip. The semiconductor chip can be employed in a device described herein (e.g., a mobile device).

Embodiments can include a non-transitory (i.e., a non-transient) machine-readable media and/or a non-transitory (i.e., a non-transient) computer-readable media embodying instructions which, when executed by a processor, transform a processor and any other cooperating devices into a machine configured to perform at least a part of a function described hereby and/or transform a processor and any other cooperating devices into at least a part of the apparatus described hereby.

Nothing stated or illustrated herein is intended to cause a dedication of any component, step, feature, object, benefit, advantage, or equivalent to the public, regardless of whether the component, step, feature, object, benefit, advantage, or the equivalent is recited in the claims.

While this disclosure describes exemplary embodiments of the invention, it should be noted that various changes and modifications could be made herein without departing from the scope of the invention as defined by the appended claims.

What is claimed is:

1. A method for optimizing fault synchronization in a bidirectional data network utilizing Multi Protocol Label Switching (MPLS), comprising:
   receiving, in MPLS, at a downstream endpoint from a downstream node, at least one of a first Alarm Indication Signal (AIS) indicating first Fault Location Information (FLI) of an upstream interface having an interface fault and a link down indicator indicating the first FLI of the upstream interface having the interface fault; and
   transmitting, in MPLS, to an upstream endpoint by the downstream endpoint, a second AIS including a Remote Defect Indication (RDI) and a second FLI comprising the first FLI as received with associated Type-Length-Values (TLVs) identifying a source of the first FLI and the second FLI identifying the downstream endpoint and including associated MPLS Transport-Profile (TP) identifiers, wherein the downstream endpoint utilizes the second AIS instead of running a Bidirectional Forward Detection (BFD) mechanism in MPLS to notify the upstream endpoint, and wherein the downstream endpoint determines that the second AIS was sent by the upstream endpoint based on the second FLI to process the second AIS as an RDI.

2. An apparatus at a downstream endpoint configured to optimize fault synchronization in a bidirectional data network utilizing Multi Protocol Label Switching (MPLS), comprising:
   a circuit configured to receive, in MPLS, from a downstream node, at least one of a first Alarm Indication Signal (AIS) indicating first Fault Location Information (FLI) of an upstream interface having an interface fault and a link down indicator indicating the first FLI of the upstream interface having the interface fault; and
   a circuit configured to transmit, in MPLS, to an upstream endpoint, a second AIS including a Remote Defect Indication (RDI) and a second FLI comprising the first FLI as received with associated Type-Length-Values (TLVs) identifying a source of the first FLI and the second FLI identifying the downstream endpoint and including MPLS Transport-Profile (TP) identifiers, wherein the downstream endpoint utilizes the second AIS instead of running a Bidirectional Forward Detection (BFD) mechanism in MPLS to notify the upstream endpoint, and wherein the downstream endpoint determines that the second AIS was sent by the upstream endpoint based on the second FLI to process the second AIS as an RDI.

3. The apparatus of claim 2, wherein at least a part of the circuit configured to transmit is integrated on a semiconductor die.

4. The apparatus of claim 2, further comprising at least one of a network interface, a physical layer device, a router, a switch, a transceiver, a repeater, an add-drop multiplexer, a transponder, and an electrical device configured to process data, with which the circuit configured to transmit is integrated.

5. An apparatus at a downstream endpoint configured to optimize fault synchronization in a bidirectional data network utilizing Multi Protocol Label Switching (MPLS), comprising:
   a receiver and a transmitter; and
   a processor implemented in a circuit configured to:
      receive, in MPLS, from a downstream node via the receiver, at least one of a first Alarm Indication Signal (AIS) indicating first Fault Location Information (FLI) of an upstream interface having an interface fault and a link down indicator indicating the first FLI of the upstream interface having the interface fault; and transmit, in MPLS, to an upstream endpoint, a second AIS including a Remote Defect Indication (RDI) and a second FLI comprising the first FLI as received with associated Type-Length-Values (TLVs) identifying a source of the first FLI and the second FLI identifying the downstream endpoint and including MPLS Transport-Profile (TP) identifiers, wherein the downstream endpoint utilizes the second AIS instead of running a Bidirectional Forward Detection (BFD) mechanism in MPLS to notify the upstream endpoint, and wherein the downstream endpoint determines that the second AIS was sent by the upstream endpoint based on the second FLI to process the second AIS as an RDI.

6. The apparatus of claim 5, wherein at least a part of the processor is integrated on a semiconductor die.

7. The apparatus of claim 5, further comprising at least one of a network interface, a physical layer device, a router, a switch, a transceiver, a repeater, an add-drop multiplexer, a transponder, and an electrical device configured to process data, with which the processor is integrated.

8. A non-transitory computer-readable medium, comprising instructions stored thereon that, if executed by a processor, cause the processor to execute a method for optimizing fault synchronization in a bidirectional data network utilizing Multi Protocol Label Switching (MPLS), comprising:

receiving, in MPLS, at a downstream endpoint from a downstream node, at least one of a first Alarm Indication Signal (AIS) indicating first Fault Location Information (FLI) of an upstream interface having an interface fault and a link down indicator indicating the first FLI of the upstream interface having the interface fault; and transmitting, in MPLS, to an upstream endpoint, a second AIS including a Remote Defect Indication (RDI) and a second FLI comprising the first FLI as received with associated Type-Length-Values (TLVs) identifying a source of the first FLI and the second FLI identifying the downstream endpoint and including MPLS Transport-Profile (TP) identifiers, wherein the downstream endpoint utilizes the second AIS instead of running a Bidirectional Forward Detection (BFD) mechanism in MPLS to notify the upstream endpoint, and wherein the downstream endpoint determines that the second AIS was sent by the upstream endpoint based on the second FLI to process the second AIS as an RDI.

9. The non-transitory computer-readable medium of claim 8, further comprising at least one of a network interface, a physical layer device, a router, a switch, a transceiver, a repeater, an add-drop multiplexer, a transponder, and an electrical device configured to process data, with which the computer-readable medium is integrated.

10. A non-transitory computer-readable medium, comprising instructions stored thereon that, if executed by a lithographic device, cause the lithographic device to fabricate at least a part of an integrated circuit for optimizing fault synchronization in a bidirectional data network utilizing Multi Protocol Label Switching (MPLS), comprising:

a receiver and a transmitter; and
a processor implemented in the integrated circuit configured to:

receive, in MPLS, at a downstream endpoint from a downstream endpoint via the receiver, at least one of a first Alarm Indication Signal (AIS) indicating first Fault Location Information (FLI) of an upstream interface having an interface fault and a link down indicator indicating the first FLI of the upstream interface having the interface fault; and transmit, in MPLS, to an upstream endpoint, a second AIS including a Remote Defect Indication (RDI) and a second FLI comprising the first FLI as received with associated Type-Length-Values (TLVs) identifying a source of the first FLI and the second FLI identifying the downstream endpoint and including MPLS Transport-Profile (TP) identifiers, wherein the downstream endpoint utilizes the second AIS instead of running a Bidirectional Forward Detection (BFD) mechanism in MPLS to notify the upstream endpoint, and wherein the downstream endpoint determines that the second AIS was sent by the upstream endpoint based on the second FLI to process the second AIS as an RDI.

11. A method for optimizing fault synchronization in a bidirectional data network utilizing Multi Protocol Label Switching (MPLS), comprising:

receiving, in MPLS, at an upstream endpoint from a downstream endpoint, an Alarm Indication Signal (AIS) including a Remote Defect Indication (RDI) and Fault Location Information (FLI) and including MPLS Transport-Profile (TP) identifiers;

determining that the RDI is an AIS-RDI from the presence of the FLI in the AIS, wherein the determining is based on the presence of a second FLI comprising a first FLI as received by the downstream endpoint from a downstream node with associated Type-Length-Values (TLVs) identifying a source of the first FLI along with a source of the second FLI; and initiating tunnel failure synchronization with the downstream endpoint, based on the presence of the AIS-RDI, wherein the downstream endpoint utilizes the AIS instead of running a Bidirectional Forward Detection (BFD) mechanism in MPLS to notify the upstream endpoint.

12. An apparatus at an upstream endpoint configured to optimize fault synchronization in a bidirectional data network utilizing Multi Protocol Label Switching (MPLS), comprising:

a circuit configured to receive, in MPLS, from a downstream endpoint, an Alarm Indication Signal (AIS) including a Remote Defect Indication (RDI) and Fault Location Information (FLI) and including MPLS Transport-Profile (TP) identifiers;

a circuit configured to determine that the RDI is an AIS-RDI from the presence of the FLI in the AIS, wherein the determining is based on the presence of a second FLI comprising a first FLI as received by the downstream endpoint from a downstream node with associated Type-Length-Values (TLVs) identifying a source of the first FLI along with a source of the second FLI; and a circuit configured to initiate tunnel failure synchronization with the downstream endpoint, based on the presence of the AIS-RDI, wherein the downstream endpoint utilizes the AIS instead of running a Bidirectional Forward Detection (BFD) mechanism in MPLS to notify the upstream endpoint.

13. The apparatus of claim 12, wherein at least a part of the circuit configured to determine is integrated on a semiconductor die.

14. The apparatus of claim 12, further comprising at least one of a network interface, a physical layer device, a router, a switch, a transceiver, a repeater, an add-drop multiplexer, a transponder, and an electrical device configured to process data, with which the circuit configured to determine is integrated.

15. An apparatus configured to optimize fault synchronization in a bidirectional data network utilizing Multi Protocol Label Switching (MPLS), comprising:
   a receiver; and
   a processor implemented in a circuit configured to:
      receive, in MPLS, at an upstream endpoint from a downstream endpoint via the receiver, an Alarm Indication Signal (AIS) including a Remote Defect Indication (RDI) and Fault Location Information (FLI) and including MPLS Transport-Profile (TP) identifiers;
      determine that the RDI is an AIS-RDI from the presence of the FLI in the AIS, wherein the determining is based on the presence of a second FLI comprising a first FLI as received by the downstream endpoint from a downstream node with associated Type-Length-Values (TLVs) identifying a source of the first FLI along with a source of the second FLI; and
      initiate tunnel failure synchronization with the downstream endpoint, based on the presence of the AIS-RDI, wherein the downstream endpoint utilizes the AIS instead of running a Bidirectional Forward Detection (BFD) mechanism in MPLS to notify the upstream endpoint.

16. The apparatus of claim 15, wherein at least a part of the processor is integrated on a semiconductor die.

17. The apparatus of claim 15, further comprising at least one of a network interface, a physical layer device, a router, a switch, a transceiver, a repeater, an add-drop multiplexer, a transponder, and an electrical device configured to process data, with which the processor is integrated.

18. A non-transitory computer-readable medium, comprising instructions stored thereon that, if executed by a processor, cause the processor to execute a method for optimizing fault synchronization in a bidirectional data network utilizing Multi Protocol Label Switching (MPLS), comprising:
   receiving, in MPLS, at an upstream endpoint from a downstream endpoint, an Alarm Indication Signal (AIS) including a Remote Defect Indication (RDI) and Fault Location Information (FLI) and including MPLS Transport-Profile (TP) identifiers;
   determining that the RDI is an AIS-RDI from the presence of the FLI in the AIS, wherein the determining is based on the presence of a second FLI comprising a first FLI as received by the downstream endpoint from a downstream node with associated Type-Length-Values (TLVs) identifying a source of the first FLI along with a source of the second FLI; and
   initiating tunnel failure synchronization with the downstream endpoint, based on the presence of the AIS-RDI, wherein the downstream endpoint utilizes the AIS instead of running a Bidirectional Forward Detection (BFD) mechanism in MPLS to notify the upstream endpoint.

19. The non-transitory computer-readable medium of claim 18, further comprising at least one of a network interface, a physical layer device, a router, a switch, a transceiver, a repeater, an add-drop multiplexer, a transponder, and an electrical device configured to process data, with which the computer-readable medium is integrated.

20. A non-transitory computer-readable medium, comprising instructions stored thereon that, if executed by a lithographic device, cause the lithographic device to fabricate at least a part of an integrated circuit for optimizing fault synchronization in a bidirectional data network utilizing Multi Protocol Label Switching (MPLS), comprising:
   a receiver; and
   a processor implemented in the integrated circuit configured to:
      receive, in MPLS, at an upstream endpoint from a downstream endpoint, an Alarm Indication Signal (AIS) including a Remote Defect Indication (RDI) and Fault Location Information (FLI) and including MPLS Transport-Profile (TP) identifiers;
      determine that the RDI is an AIS-RDI from the presence of the FLI in the AIS, wherein the determining is based on the presence of a second FLI comprising a first FLI as received by the downstream endpoint from a downstream node with associated Type-Length-Values (TLVs) identifying a source of the first FLI along with a source of the second FLI; and
      initiate tunnel failure synchronization with the downstream endpoint, based on the presence of the AIS-RDI, wherein the downstream endpoint utilizes the AIS instead of running a Bidirectional Forward Detection (BFD) mechanism in MPLS to notify the upstream endpoint.

* * * * *